United States Patent
Wu et al.

(10) Patent No.: US 11,043,818 B2
(45) Date of Patent: Jun. 22, 2021

(54) RANDOM ROLLING SCHEDULING METHOD FOR POWER SYSTEM BASED ON NEWTON METHOD

(71) Applicants: TSINGHUA UNIVERSITY, Beijing (CN); STATE GRID CORPORATION OF CHINA, Beijing (CN)

(72) Inventors: Wenchuan Wu, Beijing (CN); Bin Wang, Beijing (CN); Mingjie Li, Beijing (CN); Hongbin Sun, Beijing (CN); Qinglai Guo, Beijing (CN); Yue Yang, Beijing (CN); Shuwei Xu, Beijing (CN)

(73) Assignees: TSINGHUA UNIVERSITY, Beijing (CN); STATE GRID CORPORATION OF CHINA, Beijing (CN)

( * ) Notice: Subject to any disclaimer, the term of this patent is extended or adjusted under 35 U.S.C. 154(b) by 82 days.

(21) Appl. No.: 16/542,620

(22) Filed: Aug. 16, 2019

(65) Prior Publication Data

US 2020/0266632 A1 Aug. 20, 2020

(30) Foreign Application Priority Data

Feb. 19, 2019 (CN) .......................... 201910121923.5

(51) Int. Cl.
  *H02J 3/38* (2006.01)
  *G05B 19/042* (2006.01)

(52) U.S. Cl.
  CPC ............ *H02J 3/386* (2013.01); *G05B 19/042* (2013.01); *G05B 2219/2639* (2013.01); *H02J 2203/20* (2020.01)

(58) Field of Classification Search
  CPC .. H02J 3/381; H02J 3/382; H02J 3/386; H02J 2203/20; H02J 2300/20; G05B 17/02; G05B 19/042; G05B 2219/2639; Y02E 10/76

See application file for complete search history.

(56) References Cited

U.S. PATENT DOCUMENTS

| | | | | |
|---|---|---|---|---|
| 7,203,622 | B2 * | 4/2007 | Pan ........................... | H02J 3/00 702/184 |
| 10,359,750 | B2 * | 7/2019 | Wu ........................... | H02J 3/00 |
| 10,923,916 | B2 * | 2/2021 | Wu ........................ | H02J 3/382 |
| 2004/0158772 | A1 * | 8/2004 | Pan ........................... | H02J 3/00 714/14 |
| 2005/0246039 | A1 * | 11/2005 | Iino ....................... | G05B 13/048 700/29 |
| 2017/0300021 | A1 * | 10/2017 | Wu ........................... | H02J 3/00 |
| 2020/0006946 | A1 * | 1/2020 | Fife ..................... | G06Q 10/0639 |
| 2020/0212677 | A1 * | 7/2020 | Wolkoff .................. | H02J 3/322 |
| 2020/0266631 | A1 * | 8/2020 | Wu ......................... | H02J 3/382 |

* cited by examiner

*Primary Examiner* — M. N. Von Buhr
(74) *Attorney, Agent, or Firm* — Hodgson Russ LLP

(57) ABSTRACT

The disclosure provides a stochastic look-ahead dispatch method for power system based on Newton method, belonging to power system dispatch technologies. The disclosure analyzes historical data of wind power output, and uses statistical or fitting software to perform Gaussian mixture model fitting. A dispatch model with chance constraints is established for system parameters. Newton method is to solve quantiles of random variables obeying Gaussian mixture model, so that chance constraints are transformed into deterministic linear constraints, thus transforming original problem to convex optimization problem with linear constraints. Finally, the model is solved to obtain look-ahead dispatch. The disclosure employs Newton method to transform chance constraints containing risk level and random variables into deterministic linear constraints, which effectively improves model solution efficiency, and provides reasonable dispatch for decision makers. The disclosure is employed to the dispatch of the power system including large-scale renewable energy grid-connected.

1 Claim, No Drawings

US 11,043,818 B2

RANDOM ROLLING SCHEDULING METHOD FOR POWER SYSTEM BASED ON NEWTON METHOD

CROSS-REFERENCE TO RELATED APPLICATION

This application claims priority to Chinese Patent Application No. 201910121923.5, filed Feb. 19, 2019, the entire disclosure of which is incorporated herein by reference.

TECHNICAL FIELD

The present disclosure relates to a stochastic look-ahead dispatch method for a power system based on Newton method, and more particularly to a stochastic look-ahead dispatch method with chance constraints for a power system based on solving quantiles via Newton method, belonging to the field of power system operation and dispatch technologies.

BACKGROUND

The development and utilization of wind power resources and the realization of energy sustainability are major initiatives in energy development strategy. With the large-scale access of renewable energy to the power grid, it poses two problems for a look-ahead dispatch of the power system.

On the one hand, an accurate and flexible prediction on wind power output is the basis for realizing the safe and economical look-ahead dispatch. Conventional prediction methods include an interval description method with given upper and lower limits of the output, and a description method of simple Gaussian probability density function. Although models such as beta distribution and versatile distribution, may be also employed in the output prediction of the renewable energy, they may not accurately fit the wind power output, or bring great difficulties for solving the look-ahead dispatch model. Therefore, it needs to employ an accurate and flexible prediction model.

On the other hand, the volatility and stochastic feature of the renewable energy make conventional deterministic look-ahead dispatch methods difficult to be applied. Robust look-ahead dispatch may be feasible. However, due to the conservative nature of robust optimization, it will bring unnecessary costs to the dispatch. The stochastic look-ahead dispatch with chance constraints is an effective modeling strategy that takes into account system operation risk and cost reduction. This method limits the probability of occurrence of the risk to a predetermined confidence level, and obtains the lowest cost dispatch strategy by minimizing a value of an objective function. However, the existence of random variables in the constraints and the objective function makes the solution of the chance constrained optimization problems very difficult. The existing solution methods generally have the disadvantage of large computational complexity. However, the relaxation solution method makes solution results less accurate and cannot achieve the efficient unit commitment.

In summary, the modeling and rapid solution of the dynamic look-ahead dispatch considering the stochastic feature of the output of the renewable energy is still a major problem affecting the utilization of renewable energy.

SUMMARY

The object of the present disclosure is to propose a stochastic look-ahead dispatch method for a power system based on Newton method. An output of renewable energy may be accurately fitted based on Gaussian mixture model, and quantiles of random variables may be solved based on Newton method, thereby transforming chance constraints into deterministic linear constraints, which makes full use of the advantages of the look-ahead dispatch with chance constraints, effectively reduces the system risk and saves the cost of power grid dispatch.

The stochastic look-ahead dispatch method for the power system based on Newton method, provided in the present disclosure, may include the following steps.

(1) A stochastic look-ahead dispatch model with chance constraints for the power system based on solving quantiles of random variables via Newton method, is established. The stochastic look-ahead dispatch model includes an objective function and constraints. The establishing includes the following steps.

(1-1) The objective function of the stochastic look-ahead dispatch model with chance constraints based on solving quantiles of random variables via Newton method, is established.

The objective function is to minimize a sum of expected generating costs of thermal power generating units in the power system by a formula of:

$$\min \sum_{t=1}^{T} \left[ \sum_{i=1}^{N_G} E(CF_i(\tilde{P}_i^T)) \right],$$

where, T denotes the number of dispatch intervals t; $N_G$ denotes the number of thermal power generating units in the power system; t denotes a serial number of dispatch intervals; i denotes a serial number of thermal power generating units; $\tilde{P}_i^t$ denotes an actual power of thermal power generating unit i at dispatch interval t; $E(\cdot)$ denotes an expected value of a random variable; $CF_i$ denotes a fuel cost function of thermal power generating unit i. The fuel cost function of the thermal power generating unit is expressed as a quadratic function of the actual power of the thermal power generating unit by a formula of:

$$CF_i(\tilde{P}_i^t) = a_i(\tilde{P}_i^t)^2 + b_i\tilde{P}_i^t + c_i,$$

where, $a_i$ denotes a quadratic coefficient of a fuel cost of thermal power generating unit i; $b_i$ denotes a linear coefficient of the fuel cost of thermal power generating unit i; $c_i$ denotes a constant coefficient of the fuel cost of thermal power generating unit i; and values of $a_i$, $b_i$, and $c_i$ are obtained from a dispatch center.

The actual power $\tilde{P}_i^t$ of the thermal power generating unit is denoted by formulas of:

$$\tilde{P}_i^t = P_i^t - \alpha_i \left( \sum_{j=1}^{N_W} \tilde{w}_j^t - \sum_{j=1}^{N_W} w_j^t \right),$$

$$\sum_{i=1}^{N_G} \alpha_i = 1$$

where, $P_i^t$ denotes a scheduled output of thermal power generating unit i at dispatch interval t; $\alpha_i$ denotes a power participation coefficient of thermal power generating unit i and is determined by a ratio of a rated capacity of the thermal power generating unit to a total capacity of all thermal power generating units participating in power generating in the power system, in which a sum of power participation coefficients of the all thermal power generating units is equal to 1; $\tilde{w}^t_j$ denotes an actual power of renewable energy power station j at dispatch interval t; $w^t_j$ denotes a scheduled output of renewable energy power station j at dispatch interval t; $N_W$ denotes the number of renewable energy power stations;

$$\sum_{j=1}^{N_W} \tilde{w}^t_j - \sum_{j=1}^{N_W} w^t_j$$

denotes a power difference between actual powers and scheduled outputs of all renewable energy power plants in the power system.

A joint probability distribution of actual powers of all renewable energy power stations in the power system at dispatch interval t is set to satisfy the following Gaussian mixture model:

$$\tilde{w}^t = \{\tilde{w}^t_j \mid 1 \le j \le N_W\}$$

$$PDF_{\tilde{w}^t}(Y) = \sum_{s=1}^{n} \omega_s N\left(Y, \mu_s, \sum_s\right), \omega_s \ge 0$$

$$N\left(Y \mid \mu_s, \sum_s\right) = \frac{1}{(2\pi)^{N_W/2} \det(\sum_s)^{1/2}} e^{-\frac{1}{2}(Y-\mu_s)^T \Sigma_s^{-1}(Y-\mu_s)},$$

where, $\tilde{w}^t$ denotes a set of scheduled outputs of all renewable energy power stations in the power system at dispatch interval t; $\tilde{w}^t$ is a stochastic vector; $PDF_{\tilde{w}^t}$ denotes a probability density function of the stochastic vector $\tilde{w}^t$; Y denotes values of $\tilde{w}^t$; $N(Y, \mu_s, \Sigma_s)$ denotes the $s^{-th}$ component of the Gaussian mixture model; n denotes the number of components of the Gaussian mixture model; $\omega_s$ denotes a weighting coefficient representing the $s^{-th}$ component of the Gaussian mixture model, in which, a sum of weighting coefficients of all components is equal to 1; $\mu_s$ denotes an average vector of the $s^{-th}$ component of the Gaussian mixture model; $\Sigma_s$ denotes a covariance matrix of the $s^{-th}$ component of the Gaussian mixture model; $\det(\Sigma_s)$ denotes a determinant of the covariance matrix $\Sigma_s$; and a superscript T indicates a transposition of matrix.

The Gaussian mixture model of actual powers of all renewable energy power stations in the power system is substituted into the objective function to obtain the objective function of the stochastic look-ahead dispatch model with chance constraints for the power system based on solving quantiles of random variables as a formula of:

where, 1 denotes a column vector with $N_W$ dimension, in which all elements in the column vector are equal to 1.

(1-2) Constraints of the stochastic look-ahead dispatch model with chance constraints based on solving quantiles of random variables are obtained. The obtaining may include the following steps.

(1-2-1) A power balance constraint of the power system is obtained by a formula of:

$$\sum_{i=1}^{N_G} P^t_i + \sum_{j=1}^{N_W} w^t_j = \sum_{k=1}^{N_D} d^t_k.$$

where, $P^t_i$ denotes a scheduled output of thermal power generating unit i at dispatch interval t; $w^t_j$ denotes a scheduled output of renewable energy power station j at dispatch interval t; $d^k_t$ denotes a size of load k at dispatch interval t; and $N_D$ denoting the number of loads in the power system.

(1-2-2) An upper and lower constraint of the output of the thermal power generating unit is obtained by a formula of $$Pr\left(P^t_i - \alpha_i\left(\sum_{j=1}^{N_W} \tilde{w}^t_j - \sum_{j=1}^{N_W} w^t_j\right) \le \overline{P}_i\right) \ge 1 - \varepsilon^+_g$$

$$Pr\left(P^t_i - \alpha_i\left(\sum_{j=1}^{N_W} \tilde{w}^t_j - \sum_{j=1}^{N_W} w^t_j\right) \ge \underline{P}_i\right) \ge 1 - \varepsilon^-_g,$$

where, $\underline{P}_i$ denotes an output lower limit of thermal power generating unit i; $\overline{P}_i$ denotes an output upper limit of thermal power generating unit i; $\varepsilon^+_g$ and $\varepsilon^-_g$ denote set acceptable risk levels; $\varepsilon^+_g$ and $\varepsilon^-_g$ are obtained from the dispatch center; $Pr(\cdot)$ denotes a probability of occurrence of an event and a value of the probability is obtained from the dispatch center.

(1-2-3) An upper and lower constraint of a scheduled value of the actual power of the renewable energy power station is obtained by a formula of:

$$0 \le w^t_j \le \overline{w}^t_j,$$

where, $w^t_j$ denotes the scheduled output of renewable energy power station j at dispatch interval t; and $\overline{w}^t_j$ denotes an upper limit of an allowable output of renewable energy power station j at dispatch interval t.

(1-2-4) A ramp constraint of the thermal power generating unit in the power system is obtained, by a formula of:

$$P^t_i - P^{t-1}_i \ge -RD_i \Delta T,$$

$$P^t_i - P^{t-1}_i \le RU_i \Delta T$$

where, $RU_i$ denotes upward ramp capacities of thermal power generating unit i, and $RD_i$ denotes downward ramp capacities of thermal power generating unit i; and $\Delta T$ denotes an interval between two adjacent dispatch intervals.

$$\min \sum_{t=1}^{T}\left[\sum_{i=1}^{N_G} E(CF_i(\tilde{P}^T_i))\right] = \sum_{t=1}^{T}\sum_{i=1}^{N_G}\left[\begin{array}{l} a_i\left(P^t_i + \alpha_i \sum_{i=1}^{N_W} w^t_i\right)^2 + \left(b_i - 2a_i\alpha_i\left(\sum_{i=1}^{n} \omega_i 1^T \mu_i\right)\right)\left(P^t_i + \alpha_i \sum_{i=1}^{N_W} w^t_i\right) + \\ a_i\alpha_i^2\left(\sum_{i=1}^{n} \omega_i\left[(1^T \mu_i)^2 + 1^T \sum_i 1\right]\right) - b_i\alpha_i\left(\sum_{i=1}^{n} \omega_i 1^T \mu_i\right) + c_i \end{array}\right]$$

(1-2-5) A branch flow constraint of the power system is obtained by a formula of:

$$Pr\left(\sum_{i=1}^{N_G} G_{l,i}\hat{P}_i^t + \sum_{j=1}^{N_W} G_{l,j}\tilde{w}_j^t - \sum_{k=1}^{N_D} G_{l,k} d_k^t \leq L_l\right) \geq 1-\eta$$

$$Pr\left(\sum_{i=1}^{N_G} G_{l,i}\hat{P}_i^t + \sum_{j=1}^{N_W} G_{l,j}\tilde{w}_j^t - \sum_{k=1}^{N_D} G_{l,k} d_k^t \geq -L_l\right) \geq 1-\eta,$$

where, $G_{l,i}$ denotes a power transfer distribution factor of branch l to the actual output of thermal power generating unit i; $G_{l,j}$ denotes a power transfer distribution factor of branch l to the actual output of renewable energy power station j; $G_{l,k}$ denotes a power transfer distribution factor of branch l to load k; each power transfer distribution factor is obtained from the dispatch center; $L_l$ denotes an active power upper limit on branch l; and $\eta$ denotes a risk level of an active power on the branch of the power system exceeding a rated active power upper limit of the branch, which is determined by a dispatcher.

(2) Based on the objective function and constraints of the stochastic look-ahead dispatch model, the Newton method is employed to solve quantiles of random variables, which includes the following steps.

(2-1) The chance constraints are converted into deterministic constraints containing quantiles, which includes the following steps.

A general form of the chance constraints is denoted by a formula of:

$$Pr(c^T\tilde{w}^t + d^T x \leq e) \geq 1-p,$$

where, c and d denote constant vectors with $N_W$ dimension in the chance constraints; $N_W$ denotes the number of renewable energy power stations in the power system; e denotes constants in the chance constraints; p denotes a risk level of the chance constraints, which is obtained from the dispatch center in the power system; $\tilde{w}^t$ denotes an actual output vector of all renewable energy power stations at dispatch interval t; and x denotes a vector consisting of decision variables, and the decision variables are scheduled outputs of the renewable energy power stations and the thermal power generating units.

The general form of the chance constraints is converted to the deterministic constraints containing the quantiles, by a formula of:

$$e - d^T x \geq CDF^{-1}_{c^T\tilde{w}^t}(1-p),$$

where, $$CDF^{-1}_{c^T\tilde{w}^t}(1-p)$$

denotes quantiles when a probability of one-dimensional random variables $c^T\tilde{w}^t$ is equal to 1−p.

(2-2) A nonlinear equation containing the quantiles $$CDF^{-1}_{c^T\tilde{w}^t}(1-p)$$

is obtained based on Gaussian mixture model obeyed by actual powers $\tilde{w}^t$ of all renewable energy power stations in the step (1-1) as follows:

$$\sum_{s=1}^{n} \omega_s \Phi\left(\frac{y - c^T\mu_s}{\sqrt{c^T\Sigma_s c}}\right) - (1-p) = 0,$$

where, $\Phi(\cdot)$ denotes a cumulative distribution function representing a one-dimensional standard Gaussian distribution; y denotes a simple expression representing the quantile;

$$y = CDF^{-1}_{c^T\tilde{w}^t}(1-p);$$

and $\mu_s$ denotes an average vector of the $s^{-th}$ component of the Gaussian mixture model.

(2-3) The Newton method is employed, to solve the nonlinear equation of the step (2-2) iteratively to obtain the quantiles $$CDF^{-1}_{c^T\tilde{w}^t}(1-p)$$

of the random variables $c^T\tilde{w}^t$, which includes the following steps.

(2-3-1) initialization:
An initial value of y is set to $y_0$, by a formula of:

$$y_0 = \max(c^T\mu_p i \in \{1,2,\ldots,N_W\}).$$

(2-3-2) iteration:
A value of y is updated by a formula of:

$$y_{k+1} = y_k - \frac{CDF^{-1}_{c^T\tilde{w}^t}(y_k) - (1-p)}{PDF_{c^T\tilde{w}^t}(y_k)},$$

where, $$CDF^{-1}_{c^T\tilde{w}^t}(y_k)$$

denotes quantiles when a probability of one-dimensional random variables $c^T\tilde{w}^t$ is equal to 1−p; $y_k$ denotes a value of y of a previous iteration; $y_{k+1}$ denotes a value of y of a current iteration, which is to be solved; and $$PDF_{c^T\tilde{w}^t}$$

denotes a probability density function representing the stochastic vector $c^T\tilde{w}^t$, which is denoted by a formula of:

$$PDF_{c^T\tilde{w}^t}(y) = \sum_{s=1}^{n} \omega_s \frac{1}{\sqrt{2\pi c^T\Sigma_s c}} e^{-\frac{(y-c^T\mu_s)^2}{2c^T\Sigma_s c}}.$$

(2-3-3) An allowable error ε of the iterative calculation is set; it is judged an iterative calculation result based on the allowable error, in which, if $$|CDF^{-1}_{c^T\tilde{w}^t}(y_{k+1}) - (1-p)| \le \varepsilon,$$

it is determined that the iterative calculation converges, and values of the quantiles $$CDF^{-1}_{c^T\tilde{w}^t}(1-p)$$

of the random variables obtained; and if $$|CDF^{-1}_{c^T\tilde{w}^t}(y_{k+1}) - (1-p)| > \varepsilon,$$

it is returned to (2-2-2).

(3) An equivalent form $$CDF^{-1}_{c^T\tilde{w}^t}(1-p)$$

of the chance constraints is obtained in the step (1-2-6) and the step (1-2-7) based on $$CDF^{-1}_{c^T\tilde{w}^t}(1-p)$$

in the step (2).

(4) The deterministic linear constraints obtained in the step (3) is using, and an interior point method is used to solve the stochastic look-ahead dispatch model including the objective function and the constraints in the step (1) to obtain the scheduled output $P_i^t$ of thermal power generating unit i at dispatch interval t and the scheduled output $w_j^t$ of renewable energy power station j at dispatch interval t, realizing the stochastic look-ahead dispatch with chance constraints for the power system based on solving quantiles of random variables via Newton method.

The stochastic look-ahead dispatch method for the power system based on Newton method, provided in the present disclosure, may have the following advantages.

The method of the present disclosure first accurately describes the output characteristics and correlations of renewable energy predictions such as wind power/photovoltaics through the Gaussian mixture model of multiple random variables. Based on the distribution, the method of the present disclosure establishes the stochastic and dynamic dispatch model for minimizing expected generating costs by considering deterministic constraints and chance constraints. The chance constraints limit the safety risk caused by the stochastic feature of the output of the renewable energy power station such as wind power/photovoltaic to the certain confidence level during dispatch operation. At the same time, the Newton method is used to solve the quantile of the random variables obeying the Gaussian mixture model, thus transforming the chance constraints into the deterministic linear constraints. The look-ahead dispatch model is analytically expressed as quadratic programming model with linear constraints. The result of the optimization is the optimal dispatch decision of outputs of the conventional thermal power unit and the renewable energy power station such as wind power/photovoltaic, under the control of operational risk and reduced operating costs. The advantage of the method of the present disclosure, is that the Newton method is used to transform the chance constraints containing the risk level and the random variables into the deterministic linear constraints, which effectively improves the efficiency of solving the model. Meanwhile, the model with chance constraints and with adjustable risk level eliminates the conservative nature of the conventional robust unit commitment, to provide a more reasonable dispatch basis for decision makers. The method of the present disclosure may be employed to the look-ahead dispatch of the power system with large-scale renewable energy integration.

DETAILED DESCRIPTION

The stochastic look-ahead dispatch method for the power system based on Newton method, provided in the present disclosure, may include the following steps.

(1) A stochastic look-ahead dispatch model with chance constraints for the power system based on solving quantiles of random variables via Newton method, is established. The stochastic look-ahead dispatch model includes an objective function and constraints. The establishing includes the following steps.

(1-1) The objective function of the stochastic look-ahead dispatch model with chance constraints based on solving quantiles of random variables via Newton method, is established.

The objective function is to minimize a sum of expected generating costs of thermal power generating units in the power system by a formula of:

$$\min \sum_{t=1}^{T} \left[ \sum_{i=1}^{N_G} E(CF_i(\tilde{P}_i^t)) \right],$$

where, T denotes the number of dispatch intervals t; $N_G$ denotes the number of thermal power generating units in the power system; t denotes a serial number of dispatch intervals; i denotes a serial number of thermal power generating units; $\tilde{P}_i^t$ denotes an actual power of thermal power generating unit i at dispatch interval t; E(·) denotes an expected value of a random variable; $CF_i$ denotes a fuel cost function of thermal power generating unit i. The fuel cost function of the thermal power generating unit is expressed as a quadratic function of the actual power of the thermal power generating unit by a formula of:

$$CF_i(\tilde{P}_i^t) = a_i(\tilde{P}_i^t)^2 + b_i\tilde{P}_i^t + c_i,$$

where, $a_i$ denotes a quadratic coefficient of a fuel cost of thermal power generating unit i; $b_i$ denotes a linear coefficient of the fuel cost of thermal power generating unit i; $c_i$ denotes a constant coefficient of the fuel cost of thermal power generating unit i; and values of $a_i$, $b_i$, and $c_i$ are obtained from a dispatch center.

The actual power $\tilde{P}_i^t$ of the thermal power generating unit is denoted by formulas of:

$$\tilde{P}_i^t = P_i^t - \alpha_i \left( \sum_{j=1}^{N_W} \tilde{w}_j^t - \sum_{j=1}^{N_W} w_j^t \right),$$

-continued $$\sum_{i=1}^{N_G} \alpha_i = 1$$

where, $P_i^t$ denotes a scheduled output of thermal power generating unit i at dispatch interval t; $\alpha_i$ denotes a power participation coefficient of thermal power generating unit i and is determined by a ratio of a rated capacity of the thermal power generating unit to a total capacity of all thermal power generating units participating in power generating in the power system, in which a sum of power participation coefficients of the all thermal power generating units is equal to 1; $\tilde{w}_j^t$ denotes an actual power of renewable energy power station j at dispatch interval t; $w_j^t$ denotes a scheduled output of renewable energy power station j at dispatch interval t; $N_W$ denotes the number of renewable energy power stations;

$$\sum_{j=1}^{N_W} \tilde{w}_j^t - \sum_{j=1}^{N_W} w_j^t$$

denotes a power difference between actual powers and scheduled outputs of all renewable energy power plants in the power system.

A joint probability distribution of actual powers of all renewable energy power stations in the power system at dispatch interval t is set to satisfy the following Gaussian mixture model:

$$\tilde{w}^t = \{\tilde{w}_j^t | 1 \leq j \leq N_W\}$$

$$PDF_{\tilde{w}^t}(Y) = \sum_{s=1}^{n} \omega_s N\left(Y, \mu_s, \Sigma_s\right), \omega_s \geq 0$$

$$N(Y|\mu_s, \Sigma_s) = \frac{1}{(2\pi)^{N_W/2} \det\left(\Sigma_s\right)^{\frac{1}{2}}} e^{-\frac{1}{2}(Y-\mu_s)^T \Sigma_s^{-1} (Y-\mu_s)}$$

where, $\tilde{w}^t$ denotes a set of scheduled outputs of all renewable energy power stations in the power system at dispatch interval t; $\tilde{w}^t$ is a stochastic vector; $PDF_{\tilde{w}^t}$ denotes a probability density function of the stochastic vector $\tilde{w}^t$; Y denotes values of $\tilde{w}^t$; $N(Y, \mu_s, \Sigma_s)$ denotes the $s^{-th}$ component of the Gaussian mixture model; n denotes the number of components of the Gaussian mixture model; $\omega_s$ denotes a weighting coefficient representing the $s^{-th}$ component of the Gaussian mixture model, in which, a sum of weighting coefficients of all components is equal to 1; $\mu_s$ denotes an average vector of the $s^{-th}$ component of the Gaussian mixture model; $\Sigma_s$ denotes a covariance matrix of the $s^{-th}$ component of the Gaussian mixture model; det ($\Sigma_s$) denotes a determinant of the covariance matrix $\Sigma_s$; and a superscript T indicates a transposition of matrix.

The Gaussian mixture model of actual powers of all renewable energy power stations in the power system is substituted into the objective function to obtain the objective function of the stochastic look-ahead dispatch model with chance constraints for the power system based on solving quantiles of random variables as a formula of:

$$\min \sum_{t=1}^{T} \left[\sum_{i=1}^{N_G} E(CF_i(P_i^t))\right] = \sum_{t=1}^{T}$$

$$\left[\sum_{i=1}^{N_G} \left[\begin{array}{c} a_i\left(P_i^t + \alpha_i \sum_{i=1}^{N_W} w_i^t\right)^2 + \left(b_t - 2a_t\alpha_i\left(\sum_{i=1}^{n} \omega_i 1^T \mu_i\right)\right) \\ \left(P_i^t + \alpha_i \sum_{i=1}^{N_W} w_i^t\right) + a_i\alpha_i^2\left(\sum_{i=1}^{n} \omega_i\left[(1^T\mu_i)^2 + 1^T\sum_i 1\right]\right) - \\ b_i\alpha_i\left(\sum_{i=1}^{n} \omega_i 1^T \mu_i\right) + c_i \end{array}\right]\right]$$

where, 1 denotes a column vector with $N_W$ dimension, in which all elements in the column vector are equal to 1.

(1-2) Constraints of the stochastic look-ahead dispatch model with chance constraints based on solving quantiles of random variables are obtained. The obtaining may include the following steps.

(1-2-1) A power balance constraint of the power system is obtained by a formula of:

$$\sum_{i=1}^{N_G} P_i^t + \sum_{j=1}^{N_W} w_j^t = \sum_{k=1}^{N_D} d_k^t,$$

where, $P_i^t$ denotes a scheduled output of thermal power generating unit i at dispatch interval t; $w_j^t$ denotes a scheduled output of renewable energy power station j at dispatch interval t; $d_k^t$ denotes a size of load k at dispatch interval t; and $N_D$ denoting the number of loads in the power system.

(1-2-2) An upper and lower constraint of the output of the thermal power generating unit is obtained by a formula of:

$$Pr\left(P_i^t - \alpha_i\left(\sum_{j=1}^{N_W} \tilde{w}_j^t - \sum_{j=1}^{N_W} w_j^t\right) \leq \overline{P}_i\right) \geq 1 - \varepsilon_g^+$$

$$Pr\left(P_i^t - \alpha_i\left(\sum_{j=1}^{N_W} \tilde{w}_j^t - \sum_{j=1}^{N_W} w_j^t\right) \leq \underline{P}_i\right) \geq 1 - \varepsilon_g^-$$

where, $\underline{P}_i$ denotes an output lower limit of thermal power generating unit i; $\overline{P}_i$ denotes an output upper limit of thermal power generating unit i; $\varepsilon_g^+$ and $\varepsilon_g^-$ denote set acceptable risk levels; $\varepsilon_g^+$ and $\varepsilon_g^-$ are obtained from the dispatch center; Pr (·) denotes a probability of occurrence of an event and a value of the probability is obtained from the dispatch center.

(1-2-3) An upper and lower constraint of a scheduled value of the actual power of the renewable energy power station is obtained by a formula of:

$$0 \leq w_j^t \leq \overline{w}_j^t,$$

where, $w_j^t$ denotes the scheduled output of renewable energy power station j at dispatch interval t; and $\overline{w}_j^t$ denotes an upper limit of an allowable output of renewable energy power station j at dispatch interval t.

(1-2-4) A ramp constraint of the thermal power generating unit in the power system is obtained, by a formula of:

$$P_i^t - P_i^{t-1} \geq -RD_i \Delta T,$$

$$P_i^t - P_i^{t-1} \leq RU_i \Delta T$$

where, $RU_i$ denotes upward ramp capacities of thermal power generating unit i, and $RD_i$ denotes downward ramp capacities of thermal power generating unit i; and $\Delta T$ denotes an interval between two adjacent dispatch intervals.

(1-2-5) A branch flow constraint of the power system is obtained by a formula of:

$$Pr\left(\sum_{i=1}^{N_G} G_{l,i}\tilde{P}_i^t + \sum_{j=1}^{N_W} G_{l,j}\tilde{w}_j^t - \sum_{k=1}^{N_D} G_{l,k}d_k^t \le L_l\right) \ge 1-\eta$$

$$Pr\left(\sum_{i=1}^{N_G} G_{l,i}\tilde{P}_i^t + \sum_{j=1}^{N_W} G_{l,j}\tilde{w}_j^t - \sum_{k=1}^{N_D} G_{l,k}d_k^t \ge -L_l\right) \ge 1-\eta$$

where, $G_{l,i}$ denotes a power transfer distribution factor of branch l to the actual output of thermal power generating unit i; $G_{l,j}$ denotes a power transfer distribution factor of branch l to the actual output of renewable energy power station j; $G_{l,k}$ denotes a power transfer distribution factor of branch l to load k; each power transfer distribution factor is obtained from the dispatch center; $L_l$ denotes an active power upper limit on branch l; and $\eta$ denotes a risk level of an active power on the branch of the power system exceeding a rated active power upper limit of the branch, which is determined by a dispatcher.

(2) Based on the objective function and constraints of the stochastic look-ahead dispatch model, the Newton method is employed to solve quantiles of random variables, which includes the following steps.

(2-1) The chance constraints are converted into deterministic constraints containing quantiles, which includes the following steps.

A general form of the chance constraints is denoted by a formula of:

$$Pr(c^T\tilde{w}^t + d^T x \le e) \ge 1-p,$$

where, c and d denote constant vectors with $N_W$ dimension in the chance constraints; $N_W$ denotes the number of renewable energy power stations in the power system; e denotes constants in the chance constraints; p denotes a risk level of the chance constraints, which is obtained from the dispatch center in the power system; $\tilde{w}^t$ denotes an actual output vector of all renewable energy power stations at dispatch interval t; and x denotes a vector consisting of decision variables, and the decision variables are scheduled outputs of the renewable energy power stations and the thermal power generating units.

The general form of the chance constraints is converted to the deterministic constraints containing the quantiles, by a formula of:

$$e - d^T x \ge CDF^{-1}_{c^T\tilde{w}^t}(1-p),$$

where, $$CDF^{-1}_{c^T\tilde{w}^t}(1-p)$$

denotes quantiles when a probability of one-dimensional random variables $c^T\tilde{w}^t$ is equal to $1-p$.

(2-2) A nonlinear equation containing the quantiles $$CDF^{-1}_{c^T\tilde{w}^t}(1-p)$$

is obtained based on Gaussian mixture model obeyed by actual powers $\tilde{w}^t$ of all renewable energy power stations in the step (1-1) as follows:

$$\sum_{s=1}^{n} \omega_s \Phi\left(\frac{y - c^T \mu_s}{\sqrt{c^T \Sigma_s c}}\right) - (1-p) = 0,$$

where, $\Phi(\cdot)$ denotes a cumulative distribution function representing a one-dimensional standard Gaussian distribution; y denotes a simple expression representing the quantile;

$$y = CDF^{-1}_{c^T\tilde{w}^t}(1-p);$$

and $\mu_s$ denotes an average vector of the $s^{-th}$ component of the Gaussian mixture model.

(2-3) The Newton method is employed, to solve the nonlinear equation of the step (2-2) iteratively to obtain the quantiles $$CDF^{-1}_{c^T\tilde{w}^t}(1-p)$$

of the random variables $c^T\tilde{w}^t$, which includes the following steps.

(2-3-1) initialization:
An initial value of y is set to $y_0$, by a formula of:

$$y_0 = \max(c^T\mu_i, i \in \{1, 2, \ldots, N_W\}).$$

(2-3-2) iteration:
A value of y is updated by a formula of:

$$y_{k+1} = y_k - \frac{CDF^{-1}_{c^T\tilde{w}^t}(y_k) - (1-p)}{PDF_{c^T\tilde{w}^t}(y_k)},$$

where, $$CDF^{-1}_{c^T\tilde{w}^t}(y_k)$$

denotes quantiles when a probability of one-dimensional random variables $c^T\tilde{w}^t$ is equal to $1-p$; $y_k$ denotes a value of y of a previous iteration; $y_{k+1}$ denotes a value of y of a current iteration, which is to be solved; and $$PDF_{c^T\tilde{w}^t}$$

denotes a probability density function representing the stochastic vector $c^T\tilde{w}^t$, which is denoted by a formula of:

$$PDF_{c^T\tilde{w}^t}(y) = \sum_{s=1}^{n} \omega_s \frac{1}{\sqrt{2\pi c^T \Sigma_s c}} e^{-\frac{(y-c^T\mu_s)^2}{2c^T\Sigma_s c}}.$$

(2-3-3) An allowable error ε of the iterative calculation is set; in embodiment of the present disclosure, ε is equals to $10^{-5}$; it is judged an iterative calculation result based on the allowable error, in which, if $$|CDF^{-1}_{c^T\tilde{w}^t}(y_{k+1}) - (1-p)| \le \varepsilon,$$

it is determined that the iterative calculation converges, and values of the quantiles $$CDF^{-1}_{c^T\tilde{w}^t}(1-p)$$

of the random variables are obtained; and if $$|CDF^{-1}_{c^T\tilde{w}^t}(y_{k+1}) - (1-p)| > \varepsilon,$$

it is returned to (2-2-2).

(3) An equivalent form $$CDF^{-1}_{c^T\tilde{w}^t}(1-p)$$

of the chance constraints is obtained in the step (1-2-6) and the step (1-2-7) based on $$CDF^{-1}_{c^T\tilde{w}^t}(1-p)$$

in the step (2). The chance constraints exist in the step (1-2-6) and the step (1-2-7).

$$CDF^{-1}_{c^T\tilde{w}^t}(1-p)$$

is the calculation result of the general expression of the abstracted chance constraints. Therefore, in the same way, the specific expression may be obtained from the abstract expression, thus transforming all the chance constraints into the deterministic linear constraints. Since other constraints are linear constraints on optimization variables, the objective function is a quadratic function, and the stochastic and dynamic look-ahead dispatch problem is transformed into an equivalent quadratic programming problem.

(4) The deterministic linear constraints obtained in the step (3) is using, and an interior point method is used to solve the stochastic look-ahead dispatch model including the objective function and the constraints in the step (1) to obtain the scheduled output $P_i^t$ of thermal power generating unit i at dispatch interval t and the scheduled output $w_j^t$ of renewable energy power station j at dispatch interval t, realizing the stochastic look-ahead dispatch with chance constraints for the power system based on solving quantiles of random variables via Newton method.

What is claimed is:

1. A stochastic look-ahead dispatch method for a power system based on Newton method, comprising the following steps:

(1) establishing a stochastic look-ahead dispatch model with chance constraints for the power system based on solving quantiles of random variables via Newton method, the stochastic look-ahead dispatch model comprising an objective function and constraints, the establishing comprising:

(1-1) establishing the objective function of the stochastic look-ahead dispatch model with chance constraints based on solving quantiles of random variables via Newton method, the objective function for minimizing a sum of expected generating costs of thermal power generating units in the power system by a formula of:

$$\min \sum_{t=1}^{T} \left[ \sum_{i=1}^{N_G} E(CF_i(\tilde{P}_i^t)) \right],$$

where, T denoting the number of dispatch intervals t; $N_G$ denoting the number of thermal power generating units in the power system; t denoting a serial number of dispatch intervals; i denoting a serial number of thermal power generating units; $\tilde{P}_i^t$ denoting an actual power of thermal power generating unit i at dispatch interval t; E(·) denoting an expected value of a random variable; $CF_i$ denoting a fuel cost function of thermal power generating unit i; the fuel cost function of the thermal power generating unit being expressed as a quadratic function of the actual power of the thermal power generating unit by a formula of: ti $CF_i(\tilde{P}_i^t) = a_i(\tilde{P}_i^t)^2 + b_i\tilde{P}_i^t + c_i$, where, $a_i$ denoting a quadratic coefficient of a fuel cost of thermal power generating unit i; $b_i$ denoting a linear coefficient of the fuel cost of thermal power generating unit i; $c_i$ denoting a constant coefficient of the fuel cost of thermal power generating unit i; and values of $a_i$, $b_i$, and $c_i$ being obtained from a dispatch center;

the actual power $\tilde{P}_i^t$ of the thermal power generating unit being denoted by formulas of:

$$\tilde{P}_i^t = P_i^t - \alpha_i \left( \sum_{j=1}^{N_W} \tilde{w}_j^t - \sum_{j=1}^{N_W} w_j^t \right)$$

$$\sum_{i=1}^{N_G} \alpha_i = 1,$$

where, $P_i^t$ denoting a scheduled output of thermal power generating unit i at dispatch interval t; $\alpha_i$ denoting a power participation coefficient of thermal power generating unit i and being determined by a ratio of a rated capacity of the thermal power generating unit to a total capacity of all thermal power generating units participating in power generating in the power system, in which a sum of power participation coefficients of the all thermal power generating units is equal to 1; $\tilde{w}_j^t$ denoting an actual power of renewable energy power station j at dispatch interval t; $w_j^t$ denoting a scheduled output of renewable energy power station j at dispatch interval t; $N_W$ denoting the number of renewable energy power stations;

$$\sum_{j=1}^{N_W} \tilde{w}_j^t - \sum_{j=1}^{N_W} w_j^t$$

denoting a power difference between actual powers and scheduled outputs of all renewable energy power stations in the power system;

setting a joint probability distribution of actual powers of all renewable energy power stations in the power system at dispatch interval t to satisfy the following Gaussian mixture model:

$$\tilde{w}^t = \{\tilde{w}_j^t \mid 1 \le j \le N_W\}$$

$$PDF_{\tilde{w}^t}(Y) = \sum_{s=1}^{n} \omega_s N\left(Y, \mu_s, \sum_s\right), \omega_s \ge 0$$

$$N\left(Y \mid \mu_s, \sum_s\right) = \frac{1}{(2\pi)^{N_W/2} \det(\sum_s)^{1/2}} e^{-\frac{1}{2}(Y-\mu_s)^T \Sigma_s^{-1}(Y-\mu_s)}$$

where, $\tilde{w}^t$ denoting a set of scheduled outputs of all renewable energy power stations in the power system at dispatch interval t; $\tilde{w}^t$ being a stochastic vector; $PDF_{\tilde{w}^t}$ denoting a probability density function of the stochastic vector $\tilde{w}^t$; Y denoting values of $\tilde{w}^t$; $N(Y,\mu_s,\Sigma_s)$ denoting the $s^{-th}$ component of the Gaussian mixture model; n denoting the number of components of the Gaussian mixture model; $\omega_s$ denoting a weighting coefficient representing the $s^{-th}$ component of the Gaussian mixture model, in which a sum of weighting coefficients of all components is equal to 1; $\mu_s$ denoting an average vector of the $s^{-th}$ component of the Gaussian mixture model; $\Sigma_s$ denoting a covariance matrix of the $s^{-th}$ component of the Gaussian mixture model; $\det(\Sigma_s)$ denoting a determinant of the covariance matrix $\Sigma_s$; and a superscript T indicating a transposition of matrix;

substituting the Gaussian mixture model of actual powers of all renewable energy power stations in the power system into the objective function to obtain the objective function of the stochastic look-ahead dispatch model with chance constraints for the power system based on solving quantiles of random variables as a formula of:

$$\min \sum_{t=1}^{T} \left[ \sum_{i=1}^{N_G} \mathrm{E}\left(CF_i(\tilde{P}_i^t)\right) \right] =$$

$$\sum_{t=1}^{T} \left[ \sum_{i=1}^{N_G} \left[ a_i \left( P_i^t + \alpha_i \sum_{i=1}^{N_W} w_i^t \right)^2 + \left( b_i - 2a_i \alpha_i \left( \sum_{i=1}^{n} \omega_i 1^T \mu_i \right) \right) \left( P_i^t + \alpha_i \sum_{i=1}^{N_W} w_i^t \right) + \right. \right.$$

$$\left. \left. a_i \alpha_i^2 \left( \sum_{i=1}^{n} \omega_i \left[ (1^T \mu_i)^2 + 1^T \sum_i 1 \right] \right) - b_i \alpha_i \left( \sum_{i=1}^{n} \omega_i 1^T \mu_i \right) + c_i \right] \right]$$

where, 1 denoting a column vector with $N_W$ dimension, in which all elements in the column vector are equal to 1;

(1-2) obtaining constraints of the stochastic look-ahead dispatch model with chance constraints based on solving quantiles of random variables, comprising:

(1-2-1) obtaining a power balance constraint of the power system by a formula of:

$$\sum_{i=1}^{N_G} P_i^t + \sum_{j=1}^{N_W} w_j^t = \sum_{k=1}^{N_D} d_k^t,$$

where, $P_i^t$ denoting a scheduled output of thermal power generating unit i at dispatch interval t; $w_j^t$ denoting a scheduled output of renewable energy power station j at dispatch interval t; $d_k^t$ denoting a size of load k at dispatch interval t; and $N_D$ denoting the number of loads in the power system;

(1-2-2) obtaining an upper and lower constraint of the output of the thermal power generating unit by a formula of:

$$Pr\left( P_i^t - \alpha_i \left( \sum_{j=1}^{N_W} \tilde{w}_j^t - \sum_{j=1}^{N_W} w_j^t \right) \le \overline{P}_i \right) \ge 1 - \varepsilon_g^+$$

$$Pr\left( P_i^t - \alpha_i \left( \sum_{j=1}^{N_W} \tilde{w}_j^t - \sum_{j=1}^{N_W} w_j^t \right) \ge \underline{P}_i \right) \ge 1 - \varepsilon_g^-$$

where, $\underline{P}_i$ denoting an output lower limit of thermal power generating unit i; $\overline{P}_i$ denoting an output upper limit of thermal power generating unit i; $\varepsilon_g^+$ and $\varepsilon_g^-$ denoting set acceptable risk levels; $\varepsilon_g^+$ and $\varepsilon_g^-$ being obtained from the dispatch center; $Pr(\cdot)$ denoting a probability of occurrence of an event and a value of the probability being obtained from the dispatch center;

(1-2-3) obtaining an upper and lower constraint of a scheduled value of the actual power of the renewable energy power station by a formula of:

$$0 \le w_j^t \le \overline{w}_j^t,$$

where, $w_j^t$ denoting the scheduled output of renewable energy power station j at dispatch interval t; and $\overline{W}_j^t$ denoting an upper limit of an allowable output of renewable energy power station j at dispatch interval t;

(1-2-4) obtaining a ramp constraint of the thermal power generating unit in the power system, by a formula of:

$$P_i^t - P_i^{t-1} \ge -RD_i \Delta T,$$

$$P_i^t - P_i^{t-1} \le RU_i \Delta T$$

where, $RU_i$ denoting upward ramp capacities of thermal power generating unit i, and $RD_i$ denoting downward ramp capacities of thermal power generating unit i; and $\Delta T$ denoting an interval between two adjacent dispatch intervals, in which $\Delta T$ is equal to 15 min;

(1-2-5) obtaining a branch flow constraint of the power system by a formula of:

$$Pr\left( \sum_{i=1}^{N_G} G_{l,i} \tilde{P}_i^t + \sum_{j=1}^{N_W} G_{l,j} \tilde{w}_j^t - \sum_{k=1}^{N_D} G_{l,k} d_k^t \le L_l \right) \ge 1 - \eta$$

$$Pr\left( \sum_{i=1}^{N_G} G_{l,i} \tilde{P}_i^t + \sum_{j=1}^{N_W} G_{l,j} \tilde{w}_j^t - \sum_{k=1}^{N_D} G_{l,k} d_k^t \ge -L_l \right) \ge 1 - \eta$$

where, $G_{l,i}$ denoting a power transfer distribution factor of branch l to the actual output of thermal power generating unit i; $G_{l,j}$ denoting a power transfer distribution factor of branch l to the actual output of renewable energy power station j; $G_{l,k}$ denoting a power transfer distribution factor of branch l to load k; each power transfer distribution factor being obtained from the dispatch center; $L_l$ denoting an active power upper limit on branch l; and η denoting a risk level of an active power on the branch of the power system exceeding a rated active power upper limit of the branch, which is determined by a dispatcher;

(2) based on the objective function and constraints of the stochastic look-ahead dispatch model, employing the Newton method to solve quantiles of random variables, comprising:

(2-1) converting the chance constraints into deterministic constraints containing quantiles, comprising:

denoting a general form of the chance constraints by a formula of:

$$Pr(c^T \tilde{w}^t + d^T x \leq e) \geq 1-p,$$

where, c and d denoting constant vectors with $N_W$-dimension in the chance constraints; $N_W$ denoting the number of renewable energy power stations in the power system; e denoting constants in the chance constraints; p denoting a risk level of the chance constraints, which is obtained from the dispatch center in the power system; $\tilde{w}^t$ denoting an actual output vector of all renewable energy power stations at dispatch interval t; and x denoting a vector consisting of decision variables, and the decision variables being scheduled outputs of the renewable energy power stations and the thermal power generating units;

converting the general form of the chance constraints to the deterministic constraints containing the quantiles, by a formula of:

$$e - d^T x \geq CDF^{-1}_{c^T \tilde{w}^t}(1-p),$$

where, $$CDF^{-1}_{c^T \tilde{w}^t}(1-p)$$

denoting quantiles when a probability of one-dimensional random variables $c^T \tilde{w}_t$ is equal to 1−p;

(2-2) obtaining a nonlinear equation containing the quantiles $$CDF^{-1}_{c^T \tilde{w}^t}(1-p)$$

based on Gaussian mixture model obeyed by actual powers $\tilde{w}^t$ of all renewable energy power stations in the step (1-1) as follows:

$$\sum_{s=1}^{n} \omega_s \Phi\left(\frac{y - c^T \mu_s}{\sqrt{c^T \Sigma_s c}}\right) - (1-p) = 0,$$

where, $\Phi(\cdot)$ denoting a cumulative distribution function representing a one-dimensional standard Gaussian distribution; y denoting a simple expression representing the quantile;

$$y = CDF^{-1}_{c^T \tilde{w}^t}(1-p);$$

and $\mu_s$ denoting an average vector of the $s^{-th}$ component of the Gaussian mixture model;

(2-3) employing the Newton method, to solve the nonlinear equation of the step (2-2) iteratively to obtain the quantiles $$CDF^{-1}_{c^T \tilde{w}^t}(1-p)$$

of the random variables $c^T \tilde{w}^t$, comprising:

(2-3-1) initialization:
setting an initial value of y to $y_0$, by a formula of:

$$y_0 = \max(c_T \mu_i, i \in \{1, 2, \ldots, N_W\});$$

(2-3-2) iteration:
updating a value of y by a formula of:

$$y_{k+1} = y_k - \frac{CDF^{-1}_{c^T \tilde{w}^t}(y_k) - (1-p)}{PDF_{c^T \tilde{w}^t}(y_k)},$$

where, $$CDF^{-1}_{c^T \tilde{w}^t}(y_k)$$

denoting quantiles when a probability of one-dimensional random variables $c^T \tilde{w}^t$ is equal to 1−p; $y_k$ denoting a value of y of a previous iteration; $y_{k+1}$ denoting a value of y of a current iteration, which is to be solved; and $$PDF_{c^T \tilde{w}^t}$$

denoting a probability density function representing the stochastic vector $c^T \tilde{w}^t$, which is denoted by a formula of:

$$PDF_{c^T \tilde{w}^t}(y) = \sum_{s=1}^{n} \omega_s \frac{1}{\sqrt{2\pi c^T \Sigma_s c}} e^{-\frac{(y - c^T \mu_s)^2}{2 c^T \Sigma_s c}};$$

(2-3-3) setting an allowable error a of the iterative calculation; judging an iterative calculation result based on the allowable error, in which, if $$|CDF^{-1}_{c^T \tilde{w}^t}(y_{k+1}) - (1-p)| \leq \varepsilon,$$

it is determined that the iterative calculation converges, and values of the quantiles $$|CDF^{-1}_{c^T \tilde{w}^t}(y_{k+1}) - (1-p)| > \varepsilon,$$

of the random variables are obtained; and if $$CDF^{-1}_{c^T \tilde{w}^t}(1-p)$$

it is returned to (2-3-2);

(3) obtaining an equivalent form $$CDF^{-1}_{c^T\tilde{w}^t}(1-p)$$

of the chance constraints in the step (1-2-2) and the step (1-2-5) based on $$CDF^{-1}_{c^T\tilde{w}^t}(1-p)$$

in the step (2);
(4) using deterministic linear constraints obtained in the step (3), and using an interior point method, solving the stochastic look-ahead dispatch model comprising the objective function and the constraints in the step (1) to obtain the scheduled output $P_i^t$ of thermal power generating unit i at dispatch interval t and the scheduled output $w_j^t$ of renewable energy power station j at dispatch interval t, realizing the stochastic look-ahead dispatch with chance constraints for the power system based on solving quantiles of random variables via Newton method; and
controlling the thermal power generating unit i at dispatch interval t based on the scheduled output $P_i^t$.

\* \* \* \* \*